(12) United States Patent
Miya et al.

(10) Patent No.: US 11,480,860 B2
(45) Date of Patent: Oct. 25, 2022

(54) ILLUMINATOR AND PROJECTION-TYPE DISPLAY APPARATUS

(71) Applicant: SEIKO EPSON CORPORATION, Tokyo (JP)

(72) Inventors: Hiroaki Miya, Matsumoto (JP); Akihiro Kashiwagi, Azumino (JP); Tomohiro Takagi, Azumino (JP); Yoichi Nakagomi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 217 days.

(21) Appl. No.: 16/910,145

(22) Filed: Jun. 24, 2020

(65) Prior Publication Data

US 2020/0409247 A1    Dec. 31, 2020

(30) Foreign Application Priority Data

Jun. 25, 2019    (JP) .............................. JP2019-117091

(51) Int. Cl.
  *G03B 21/20*    (2006.01)
  *G02B 3/00*    (2006.01)
  *H04N 9/31*    (2006.01)

(52) U.S. Cl.
  CPC ......... *G03B 21/204* (2013.01); *G02B 3/0062* (2013.01); *G03B 21/2013* (2013.01); *G03B 21/2073* (2013.01); *H04N 9/3161* (2013.01); *H04N 9/3164* (2013.01); *H04N 9/3167* (2013.01)

(58) Field of Classification Search
  CPC .. H04N 9/3161; H04N 9/3164; H04N 9/3167; G02B 3/0062; G03B 21/204; G03B 21/2013; G03B 21/2073
  USPC ...................................................... 353/489.07
  See application file for complete search history.

(56) References Cited

U.S. PATENT DOCUMENTS

2012/0140183 A1    6/2012    Tanaka et al.
2019/0041738 A1    2/2019    Kashiwagi

FOREIGN PATENT DOCUMENTS

JP    2012-137744 A    7/2012
JP    2019-028361 A    2/2019
WO    WO-2017090496 A1 *    6/2017    ................ F21S 2/00

* cited by examiner

*Primary Examiner* — Jerry L Brooks
(74) *Attorney, Agent, or Firm* — Oliff PLC

(57) ABSTRACT

An illuminator includes a first light source, a second light source, a first lens on which light emitted from the first and second light sources is incident, a second lens disposed in a downstream of the first lens, and a half wave plate. The first lens, the second lens and the half wave plate are arranged along a first axis. The first light source and the second light source are arranged along a plane perpendicular to the first axis. The half wave plate is disposed in the optical axis between the first lens and the second lens, the half wave plate being disposed in a position close to the second lens.

9 Claims, 6 Drawing Sheets

ILLUMINATOR AND PROJECTION-TYPE DISPLAY APPARATUS

The present application is based on, and claims priority from JP Application Serial Number 2019-117091, filed Jun. 25, 2019, the disclosure of which is hereby incorporated by reference herein in its entirety.

BACKGROUND

1. Technical Field

The present disclosure relates to an illuminator and a projection-type display apparatus.

2. Related Art

There has been a known projection-type display apparatus using a solid-state light source. For example, JP-A-2012-137744 discloses a light source apparatus including a plurality of lenses that reduce the diameter of each of the light fluxes from solid-state light sources, a dichroic mirror, and a second retardation film that controls the ratio between the polarized light components of the light flux described above. JP-A-2019-28361 discloses an illuminator including an afocal system that reduces the light flux diameter of first light outputted from a light source apparatus and a polarization adjuster disposed between a plurality of lenses that form the afocal system.

The light source apparatus described in JP-A-2012-137744, however, has a problem of a difficulty in reducing the size of the light source apparatus. In detail, the second retardation film is disposed between a plurality of lenses that form the afocal system and the dichroic mirror. The distance between the afocal system and the dichroic mirror therefore has a large value, which is likely to increase the size of the light source apparatus.

In the illuminator described in JP-A-2019-28361, the polarization adjuster is disposed between a first lens and a second lens of the afocal system, and the size of the illuminator is therefore readily reduced. On the other hand, causing the illuminator to output a high luminous flux results in a problem of color unevenness that is likely to occur in illumination light. In detail, disposing a plurality of light sources to provide a high-luminous illumination light flux is likely to increase the angle of incidence of the light flux incident on the polarization adjuster via the first lens. That is, the light flux from the light source is incident on the polarization adjuster, which is a retardation film, with the diameter of the light flux reduced. When a plurality of light sources are used, a plurality of light fluxes are outputted. The diameter of the light flux that exits out of the first lens and travels toward the second lens is sharply reduced as compared with a case where a single light source is used. In this case, the angle of incidence of the light flux greatly varies depending on the position on the retardation film. The polarization rotation efficiency of the retardation film is therefore likely to vary depending on the position described above. When the polarization rotation efficiency greatly varies, the color unevenness of the illumination light becomes noticeable, resulting in degradation, for example, in the quality of an image projected by the projection-type display apparatus. That is, an illuminator that readily allows size reduction and suppresses color unevenness of illumination light has been required.

SUMMARY

An illuminator according to the present application includes a first light source, a second light source, a first lens on which light emitted from the first and second light sources is incident, a second lens disposed in a downstream of the first lens, and a half wave plate. The first lense, the second lens and the half wave plate are arranged along a first axis. The first light source and the second light source are arranged along a plane perpendicular to the first axis. The half wave plate is disposed in the first axis between the first lens and the second lens, the half wave plate being disposed in a position close to the second lens.

In the illuminator described above, the first and second light sources each may be a solid-state light source emitting a first light containing a first polarized light component.

In the illuminator described above, the illuminator may further include a polarization adjustment mechanism. The half wave plate may transmit the first light and convert the first light into a second light containing both the first polarized light component and a second polarized light component having a polarization direction perpendicular to a polarization direction of the first polarized light component. The polarization adjustment mechanism may rotate the half wave plate in a plane intersecting a center axis of the first light.

In the illuminator described above, the illuminator may further include a polarization separator arranged along the first axis and disposed in a downstream of the second lens, a diffuser, and a wavelength converter. The second light outputted from the second lens may be incident on the polarization separator. The polarization separator may separate the second light into a third light composed of the first polarized light component and a fourth light composed of the second polarized light component. The fourth light outputted from the polarization separator may be incident on the diffuser. The third light outputted from the polarization separator may be incident on the wavelength converter.

In the illuminator described above, the wavelength converter may be excited by the third light and emit fluorescence toward the polarization separator, and the polarization separator may transmit the fluorescence.

In the illuminator described above, the illuminator may further include a quarter wave plate disposed in an optical path between the polarization separator and the diffuser.

A projection-type display apparatus according to the present application includes the illuminator described above, a light modulator modulating light outputted from the illuminator, and a projection optical apparatus projecting the light modulated by the light modulator.

DESCRIPTION OF EXEMPLARY EMBODIMENTS

Figure 1:
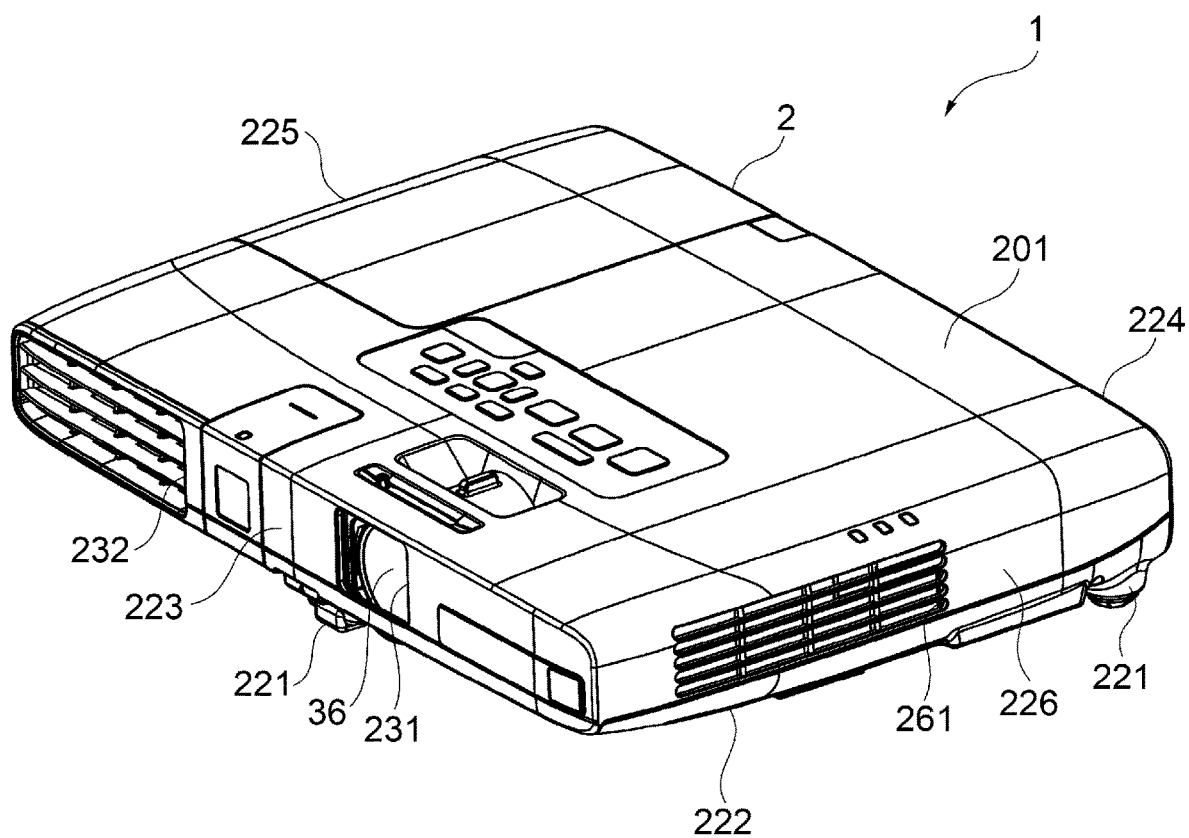
FIG. 1 is a perspective view showing the exterior appearance of a projector according to an embodiment.

An embodiment of the present disclosure will be described below with reference to the drawings. The embodiment described below is an example of the present disclosure. The present disclosure is not limited to the following embodiment and also encompasses a variety of variations implemented to the extent that the variations do not change the substance of the present disclosure. Each member in the following drawings is so drawn at a scale different from an actual scale as to be large enough to be recognizable in the drawings.

1. Embodiment 1.1. Configuration of Projector

Figure 2:
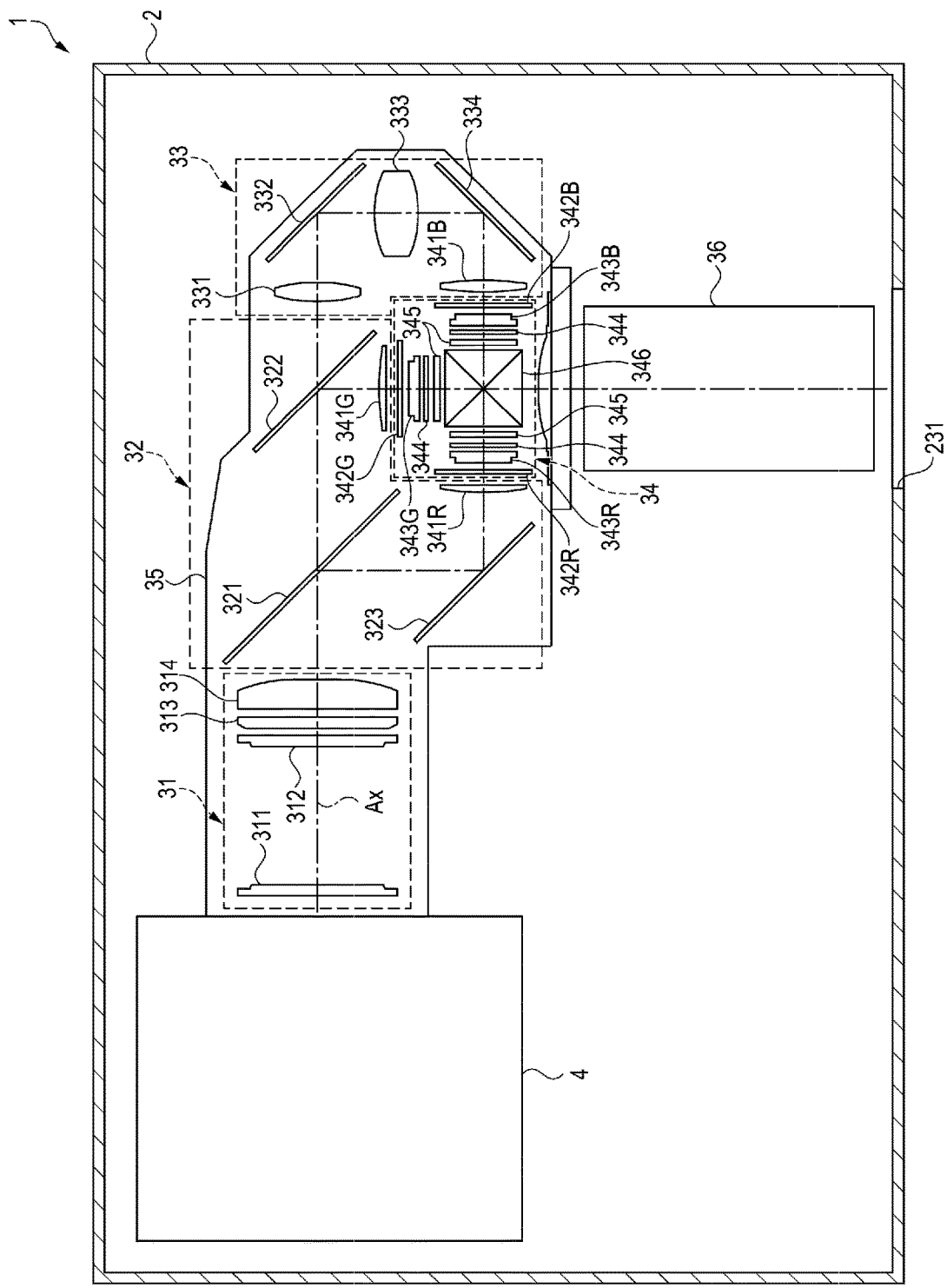
FIG. 2 is a diagrammatic view showing the internal configuration of the projector.

In the present embodiment, a projector including three liquid crystal devices, which are each a light modulator, is presented as a projection-type display apparatus byway of example. The configuration of the projector as the projection-type display apparatus will first be described with reference to FIGS. 1 and 2. FIG. 1 is a perspective view showing the exterior appearance of the projector according to the embodiment. FIG. 2 is a diagrammatic view showing the internal configuration of the projector.

The projector 1 according to the present embodiment is a projection-type image display apparatus that modulates light outputted from an illuminator that will be described later to form an image according to image information and enlarges and projects the formed image on a projection receiving surface, such as a screen.

The projector 1 includes an exterior enclosure 2, which forms the exterior of the projector 1, as shown in FIG. 1. The exterior enclosure 2 has a substantially box-like shape and includes a top surface section 201, a bottom surface section 222, a front surface section 223, a rear surface section 224, a left side surface section 225, and a right side surface section 226.

The bottom surface section 222 includes a plurality of legs 221, which are in contact with an installation surface on which the projector 1 is placed. The front surface section 223 is located on a side of the exterior enclosure 2 that is the side facing a projected image. The front surface section 223 has an opening 231, via which part of a projection optical apparatus 36 is exposed. An image is projected from the projection optical apparatus 36 via the opening 231. The front surface section 223 is provided with an exhaust port 232. A cooling gas having cooled a cooling target in the projector 1 is exhausted out of the exterior enclosure 2 via the exhaust port 232. The right side surface section 226 is provided with an introduction port 261. A gas, such as the air outside the exterior enclosure 2, is introduced as the cooling gas into the exterior enclosure 2 via the introduction port 261.

The projector 1 includes the following components in the exterior enclosure 2: an illuminator 4 according to the present embodiment; a homogenizing apparatus 31; a color separation apparatus 32; a relay apparatus 33; an image formation apparatus 34; an optical enclosure 35; and a projection optical apparatus 36, as shown in FIG. 2. The illuminator 4 outputs illumination light. The configuration of the illuminator 4 will be described later. In FIG. 2, the exhaust port 232, the introduction port 261, and other components described above are omitted. Although not shown, the projector 1 further includes a controller that controls the operation of the projector 1, a power supply that supplies electronic parts of the projector 1 with electric power, and a cooler that cools the illuminator 4 and other components.

The homogenizing apparatus 31 is disposed in the optical path along which the illumination light outputted from the light source apparatus 4 travels. The illumination light outputted from the illuminator 4 enters the homogenizing apparatus 31. The homogenizing apparatus 31 includes a first multi-lens array 311, a second multi-lens array 312, a polarization converter 313, and a superimposing lens 314. The components described above are arranged in the order described above toward the side to which the illumination light outputted from the illuminator 4 travels. The homogenizing apparatus 31 homogenizes the illumination light outputted from the illuminator 4. The homogenized illumination light exits out of the homogenizing apparatus 31, travels via the color separation apparatus 32 and the relay apparatus 33, and enters the image formation apparatus 34, and a modulation area of each of light modulators 343R, 343G, and 343B, which will be described later, is illuminated with the illumination light.

The color separation apparatus 32 is disposed in the optical path along which the illumination light having exited out of the homogenizing apparatus 31 travels. That is, the illumination light having exited out of the homogenizing apparatus 31 enters the color separation apparatus 32. The color separation apparatus 32 includes a dichroic mirror 321 as a first color separator, a dichroic mirror 322 as a second color separator, a reflection mirror 323 as a mirror, and field lenses 341R and 341G.

The color separation apparatus 32 separates the light incident from the homogenizing apparatus 31 into color light fluxes. The illumination light having entered the color separation apparatus 32 reaches the dichroic mirror 321. The dichroic mirror 321 is so disposed as to be adjacent to the superimposing lens 314 in the homogenizing apparatus 31.

The dichroic mirror 321 reflects light that is contained in the illumination light having exited out of the homogenizing apparatus 31 and belongs to a first wavelength band and transmits light that belongs to the wavelength band excluding the first wavelength band. The first wavelength band is, for example, a wavelength band corresponding to a red light region, and the wavelength band excluding the first wavelength band is a wavelength band corresponding to a green light region and a blue light region. The wavelength band corresponding to the red light region is not limited to a specific wavelength band and ranges, for example, from about 610 nm to 750 nm. The wavelength band corresponding to the blue light region is not limited to a specific wavelength band and ranges, for example, from about 430 nm to 495 nm. The wavelength band corresponding to the green light region is not limited to a specific wavelength band and ranges, for example, from about 495 nm to 570 nm.

That is, the light that belongs to the first wavelength band is, for example, red light, and the light that belongs to the wavelength band excluding the first wavelength band is green light and blue light. The red light is substantially red light, the green light is substantially green light, and the blue light is substantially blue light. The first wavelength band does not necessarily correspond to the red light region and may correspond to the green or blue light region, and the light that belongs to the first wavelength band may be green or blue light correspondingly.

The reflection mirror 323 is disposed in the optical path along which the red light reflected off the dichroic mirror 321 travels. The reflection mirror 323 reflects the red light reflected off the dichroic mirror 321 toward the field lens 341R. The field lens 341R causes the red light incident thereon to converge and travel toward the light modulator 343R.

The dichroic mirror 322 is disposed in the optical path along which the green light and the blue light having passed through the dichroic mirror 321 travel. The dichroic mirror 322 receives the green light and the blue light described above, reflects light that belongs to a second wavelength band, and transmits light that belongs to a wavelength band excluding the second wavelength band. The second wavelength band, for example, corresponds to the green light region. That is, the light that belongs to the second wavelength band is, for example, the green light, and the light that belongs to the wavelength band excluding the second wavelength band is, for example, the blue light. The second wavelength band does not necessarily correspond to the green light region and may correspond to the blue light region. That is, the light that belongs to the second wavelength band may be the blue light, and the light that belongs to the wavelength band excluding the second wavelength band may be the green light.

The field lens 341G is disposed in the optical path along which the green light reflected off the dichroic mirror 322 travels. The field lens 341G causes the green light incident thereon to converge and travel toward a light-incident-side polarizer 342G in the image formation apparatus 34.

The relay apparatus 33 is disposed in the optical path along which the blue light having passed through the dichroic mirror 322 travels. The blue light described above enters the relay apparatus 33. The relay apparatus 33 includes a light-incident-side lens 331, a first reflection mirror 332, a relay lens 333, a second reflection mirror 334, and a light-exiting-side lens 341B, which is a field lens.

The blue light has an optical path longer than those of the red light and the green light and therefore tends to have a wide light flux. The relay lens 333 therefore prevents the light flux from spreading. The blue light having entered the relay apparatus 33 enters the light-incident-side lens 331, which causes the blue light to converge, and the convergent blue light is reflected off the first reflection mirror 332 and is focused in the vicinity of the relay lens 333. The blue light having entered the relay lens 333 diverges toward the second reflection mirror 334 and the light-exiting-side lens 341B.

The second reflection mirror 334 reflects the blue light having exited out of the relay lens 333 and causes the blue light to enter the light-exiting-side lens 341B. The light-exiting-side lens 341B causes the blue light incident thereon to converge and travel toward a light-incident-side polarizer 342B in the image formation apparatus 34.

The dichroic mirrors 321 and 322 described above are each manufactured by forming a dielectric multilayer film corresponding to the function performed by the dichroic mirror on a transparent glass plate.

The image formation apparatus 34 includes light-incident-side polarizers 342R, 342G, and 342B, the light modu-lators 343R, 343G, and 343B, and three viewing angle compensators 344, three light-exiting-side polarizers 345, and a color combining apparatus 346. The light modulator 343R modulates the red light. The light modulator 343G modulates the green light. The light modulator 343B modulates the blue light. The color combining apparatus 346 is a color combiner and combines the red, green, and blue modulated light fluxes modulated by the light modulators 343R, 343G, and 343B with one another.

The light modulators 343R, 343G, and 343B modulate the illumination light outputted from the illuminator 4 in accordance with image information. In the present embodiment, the light modulators 343R, 343G, and 343B are each a transmissive liquid crystal panel. The light-incident-side polarizers 342R, 342G, and 342B, the light modulators 343R, 343G, and 343B, and the light-exiting-side polarizers 345 form liquid crystal light valves. The light modulators 343R, 343G, and 343B are not each limited to a transmissive liquid crystal panel and may each, for example, be a reflective liquid crystal panel or a digital micromirror device (DMD).

The light combining apparatus 346 combines the modulated light fluxes modulated by the light modulators 343R, 343G, and 343B with one another to form an image and causes the image to enter the projection optical apparatus 36. In the present embodiment, the color combining apparatus 346 is a cross dichroic mirror but not limited thereto. The color combining apparatus 346 may be formed, for example, of a plurality of dichroic mirrors.

The optical enclosure 35 accommodates the homogenizing apparatus 31, the color separation apparatus 32, the relay apparatus 33, and the image formation apparatus 34. An illumination optical axis Ax, which is the optical axis of the homogenizing apparatus 31, is set in the projector 1. The optical enclosure 35 holds the homogenizing apparatus 31 to the image formation apparatus 34 described above in predetermined positions along the illumination optical axis Ax. The illuminator 4 and the projection optical apparatus 36 are also disposed in predetermined positions along the illumination optical axis Ax.

The projection optical apparatus 36 enlarges and projects the image incident from the image formation apparatus 34 on the projection receiving surface that is not shown. That is, the projection optical apparatus 36 projects the modulated light fluxes modulated by the light modulators 343R, 343G, and 343B. The projection optical apparatus 36 is formed, for example, of a lens unit including a plurality of lenses accommodated in a tubular lens barrel.

1.2. Configuration of Illuminator

Figure 3:
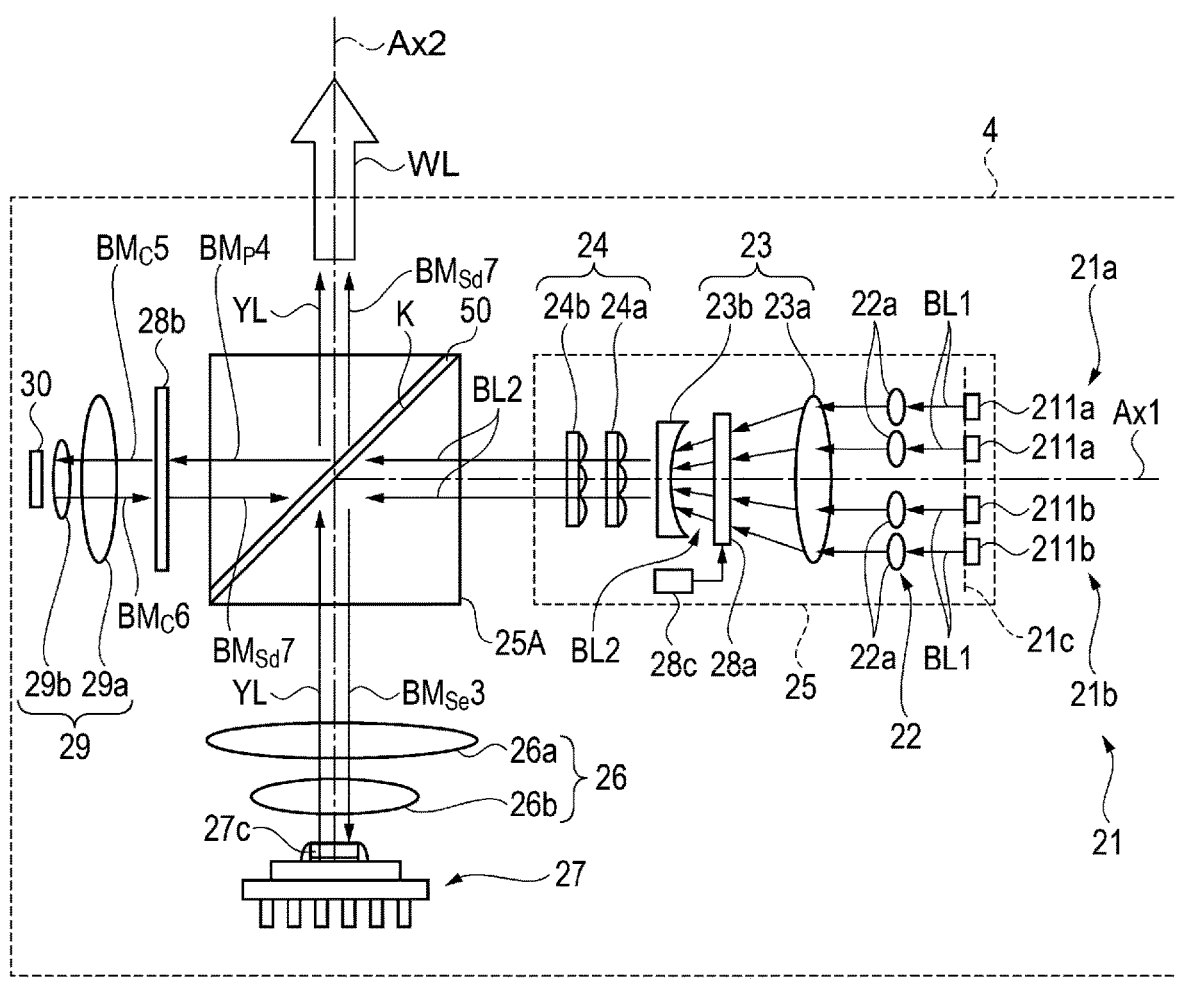
FIG. 3 is a diagrammatic view showing the configuration of an illuminator.

The configuration of the illuminator 4 according to the present embodiment will next be described with reference to FIG. 3. FIG. 3 is a diagrammatic view showing the configuration of the illuminator. The illuminator 4 outputs illumination light WL to the homogenizing apparatus 31 described above.

The illuminator 4 includes a light source unit 25, an optical element 25A including a polarization separator 50, a first pickup system 26, a wavelength converter 27, which is a fluorescence emitter, a second pickup system 29, a diffuser 30, as shown in FIG. 3. The light source unit 25 and the optical element 25A are disposed along an optical axis Ax1, which is a first axis. The wavelength converter 27 and the optical element 25A are disposed along an optical axis Ax2, which is a second axis, with the first pickup system 26 sandwiched therebetween. The homogenizing apparatus 31 that is not shown is disposed in the optical axis Ax2 on the side opposite the first pickup system 26 with respect to the optical element 25A. The diffuser 30 and the optical element 25A are disposed along the optical axis Ax1 with the second pickup system 29 sandwiched therebetween. A quarter wave plate 28b is disposed between the second pickup system 29 and the optical element 25A. The optical axes Ax1 and Ax2 are present in the same plane and perpendicular to each other.

The light source unit 25 includes a light source apparatus 21, a collimator system 22, an afocal system 23, a half wave plate 28a, which is a polarization adjuster, and a homogenizer system 24. The afocal system 23 includes a first lens 23a and a second lens 23b. The second lens 23b is disposed in a position downstream of the first lens 23a, in other words, in a position shifted from the first lens 23a toward the side to which first light BL1, which will be described later, travels. The light source apparatus 21, the collimator system 22, the first lens 23a, the half wave plate 28a, the second lens 23b, and the homogenizer system 24 are arranged along the optical axis Ax1 in the order described above in the direction from the light source apparatus 21 toward the polarization separator 50.

The light source apparatus 21 includes a first light source 21a and a second light source 21b. The first light source 21a and the second light source 21b are so disposed along a plane 21c perpendicular to the optical axis Ax1 as to sandwich the optical axis Ax1. The first light source 21a and the second light source 21b are each a solid-state light source that outputs the first light BL1. The first light source 21a includes a plurality of semiconductor lasers 211a arranged in a matrix along the plane 21c. The second light source 21b includes a plurality of semiconductor lasers 211b arranged in a matrix along the plane 21c. Since the light source apparatus 21 includes the first light source 21a and the second light source 21b, the illumination light WL outputted from the illuminator 4 is a higher luminous flux than when a single light source is employed.

The first light BL1 is linearly polarized blue light and contains a first polarized light component. The first light BL1 has, for example, a peak wavelength of 455 nm. The peak wavelength of the first light BL1 is not limited to 455 nm and may instead be 440 nm or 446 nm. The first light BL1 outputted from the first light source 21a and the first light BL1 outputted from the second light source 21b may have peak wavelengths different from each other. The first light BL1 may contain a second polarized light component having a polarization direction perpendicular to that of the first polarized light component in addition to the first polarized light component.

Although will be described later in detail, part of the first light BL1 is separated by the polarization separator 50 and forms excitation light that excites a phosphor layer 27c. The other part of the first light BL1 separated by the polarization separator 50 travels via the diffuser 30 and forms blue light for image display.

The first light BL1 outputted from the light source apparatus 21 enters the collimator system 22. The collimator system 22 converts the first light BL1 into a parallelized light flux. The collimator system 22 is formed of a plurality of collimator lenses 22a arranged in an array. The collimator lenses 22a are disposed in correspondence with the plurality of semiconductor lasers 211a and 211b so that the number of the collimator lenses 22a is equal to the number of the semiconductor lasers 211a and 211b.

The first light BL1 passes through the collimator system 22, which converts the first light BL1 into a parallelized light flux, which enters the afocal system 23. The afocal system 23 reduces the light flux diameter of the first light BL1.

In the afocal system 23, the first lens 23a and the second lens 23b are so disposed that the optical axes thereof coincide with each other. The first lens 23a is shifted from the second lens 23b toward the collimator system 22, in other words, toward the side on which the first light BL1 is incident. The first lens 23a is a convex lens. The first lens 23a causes the parallelized light flux having exited out of the collimator system 22 to converge and travel toward the second lens 23b. The second lens 23b is a concave lens. In detail, the second lens 23b has a concave surface on which the first light BL1 is incident, in other words, a concave surface facing the first lens 23a and a flat surface facing away from the concave surface. The second lens 23b converts second light BL2, which will be described later and having exited out of the first lens 23a, into a parallelized light flux. The sides that the convex surface and the flat surface of the second lens 23b face are not limited to those described above, and the configuration described above may be reversed.

The first lens 23a and the second lens 23b do not necessarily have the configuration described above. The first lens 23a and the second lens 23b may instead, for example, each be a convex lens. In this case, the light rays that form the first light BL1 intersect each other between the first lens 23a and the second lens 23b.

The half wave plate 28a is disposed between the first lens 23a and the second lens 23b of the afocal system 23. In detail, the half wave plate 28a is disposed in the optical axis Ax1 between the first lens 23a and the second lens 23b in a position close to the second lens 23b. That is, the half wave plate 28a is located in the optical axis Ax1 in a position shifted from the middle point between the first lens 23a and the second lens 23b toward the second lens 23b.

The half wave plate 28a transmits the linearly polarized first light BL1 and converts it into the second light BL2 containing the first and second polarized light components, which are each linearly polarized light. The polarization directions of the first and second polarized light components are perpendicular to each other. The first polarized light component is an s-polarized light component with respect to the polarization separator 50, and the second polarized light component is a p-polarized light component with respect to the polarization separator 50.

A polarization adjustment mechanism 28c, which rotates the half wave plate 28a in a plane that intersects the center axis of the first light BL1, is coupled to the half wave plate 28a. The polarization adjustment mechanism 28c changes the angle of the slow axis of the half wave plate 28a. Changing the angle of the slow axis of the half wave plate 28a adjusts the ratio between the first and second polarized light components of the second light BL2. In the present embodiment, the center axis of the first light BL1 refers to the optical axis Ax1.

The second light BL2 exits out of the afocal system 23 and enters the homogenizer system 24. The homogenizer system 24 converts the optical intensity distribution of the second light BL2 into what is called a top-hat distribution. The homogenizer system 24 includes a first multi-lens array 24a and a second multi-lens array 24b arranged along the optical axis Ax1. The second light BL2 having passed through the homogenizer system 24 is outputted from the light source unit 25 toward the polarization separator 50 and enters the optical element 25A.

The optical element 25A is formed of a dichroic prism. The dichroic prism has an inclining surface K, which inclines by 45° with respect to the optical axis Ax1. The inclining surface K inclines by 45° with respect also to the optical axis Ax2. The optical element 25A is so disposed that the intersection of the optical axes Ax1 and Ax2 perpendicular to each other coincides with the optical center of the inclining surface K. The optical element 25A is not limited to a prism-shaped component, such as a dichroic prism, and may instead be a parallel-plate-shaped dichroic mirror.

The inclining surface K is provided with the polarization separator 50 having wavelength selectivity. The polarization separator 50 has a polarization separation function of separating the second light BL2 into the s-polarized light component, which is the first polarized light component, and the p-polarized light component, which is the second polarized light component. In detail, the polarization separator 50 reflects the s-polarized light component of the second light BL2 and transmits the p-polarized light component of the second light BL2. The polarization separator 50 further has a color separation function of transmitting fluorescence YL, which belongs to a wavelength band different from the wavelength band to which the second light BL2, which is blue light, belongs irrespective of the polarization state of the fluorescence YL. That is, the polarization separator 50 has a wavelength selective polarization separation function of separating light having wavelengths that belong to the blue light region into the s-polarized light component and the p-polarized light component and transmitting the s-polarized light component and the p-polarized light component of light having wavelengths that belong to the green light region and the red light region.

Specifically, the polarization separator 50 separates the second light BL2, which is linearly polarized light, into third light BMse3, which is formed of the s-polarized light component, and fourth light BMp4, which is formed of the p-polarized light component. The third light BMse3 is reflected off the polarization separator 50, travels along the optical axis Ax2, and enters the first pickup system 26. The fourth light BMp4 passes through the polarization separator 50 and travels along the optical axis Ax1 toward the quarter wave plate 28b.

The first pickup system 26 causes the third light BMse3 to converge toward the wavelength converter 27. The first pickup system 26 includes first pickup lenses 26a and 26b. Out of the first pickup lenses 26a and 26b, the first pickup lens 26a is disposed in a position closer to the optical element 25A.

The third light BMse3 enters the phosphor layer 27c of the wavelength converter 27 via the first pickup system 26. The phosphor layer 27c contains a phosphor excited by the third light BMse3, which is, for example, the excitation light having a wavelength of 455 nm. When the third light BMse3 is incident on the phosphor, the phosphor produces the fluorescence YL, which is yellow light having a peak wavelength that belongs to a wavelength band ranging, for example, from 500 nm to 700 nm. The wavelength converter 27 is thus excited by the third light BMse3 and emits the fluorescence YL toward the polarization separator 50.

The fluorescence YL is emitted from the phosphor layer 27c, travels via the first pickup system 26, and enters the optical element 25A. The fluorescence YL is non-polarized light having polarization directions that are not aligned with one another. The polarization separator 50 is so characterized as to transmit the fluorescence YL irrespective of the polarization state of each polarized light component of the fluorescence YL. The fluorescence YL therefore travels along the optical axis Ax2, passes through the polarization separator 50, and enters the homogenizing apparatus 31 that is not shown. The wavelength converter 27 may be provided with a cooler for eliminating heat generated when the third light BMse3 enters the wavelength converter 27.

The quarter wave plate 28b and the second pickup system 29 are disposed in the optical path between the polarization separator 50 and the diffuser 30. The fourth light BMp4 exits out of the polarization separator 50 toward the diffuser 30 and enters the quarter wave plate 28b. The fourth light BMp4, which is formed of the p-polarized light component, is converted by the quarter wave plate 28b into circularly polarized fifth light BMc5. In the present embodiment, the fifth light BMc5 is right-handed circularly polarized light. The fifth light BMc5 having exited out of the quarter wave plate 28b enters the second pickup system 29. It is assumed in the present specification that circularly polarized light also includes elliptically polarized light having two polarized light components having different intensities as well as perfectly circularly polarized light having two polarized light components having the same intensity.

The second pickup system 29 causes the fifth light BMc5 to converge toward the diffuser 30. The second pickup system 29 includes second pickup lenses 29a and 29b. Out of the second pickup lenses 29a and 29b, the second pickup lens 29a is disposed in a position closer to the quarter wave plate 28b.

The fifth light BMc5 travels along the optical axis Ax1, passes through the second pickup system 29, and reaches the diffuser 30. The diffuser 30 diffusively reflects the fifth light BMc5 toward the optical element 25A. The diffuser 30 converts the right-handed circularly polarized fifth light BMc5 into left-handed circularly polarized sixth light BMc6 and reflects the left-handed circularly polarized sixth light BMc6.

The diffuser 30 is a flat-plate-shaped component, and a base of the diffuser 30 is provided with, although not shown, a reflection film. The base is made, for example, of a light transmissive material, such as glass. The reflection film is provided on a surface of the base that is the surface facing the second pickup system 29. The reflection film is a metal reflection film made of a metal having high optical reflectance, for example, silver and aluminum.

The sixth light BMc6 exits out of the diffuser 30, travels via the second pickup system 29, and enters the quarter wave plate 28b. The quarter wave plate 28b converts the sixth light BMc6 into s-polarized seventh light BMsd7. The seventh light BMsd7 exits out of the quarter wave plate 28b, travels along the optical axis Ax1, and enters the optical element 25A. The seventh light BMsd7 is reflected off the polarization separator 50, travels along the optical axis Ax2, and enters the homogenizing apparatus 31 that is not shown.

The seventh light BMsd7, which is blue light, and the fluorescence YL, which is yellow light, exit out of the optical element 25A toward the homogenizing apparatus 31 in the same direction along the optical axis Ax2. That is, the seventh light BMsd7 and the fluorescence YL are combined with each other into the illumination light WL, which is white light and enters the homogenizing apparatus 31.

1.3. Polarization Rotation Efficiency of Half Wave Plate

Figure 4A:
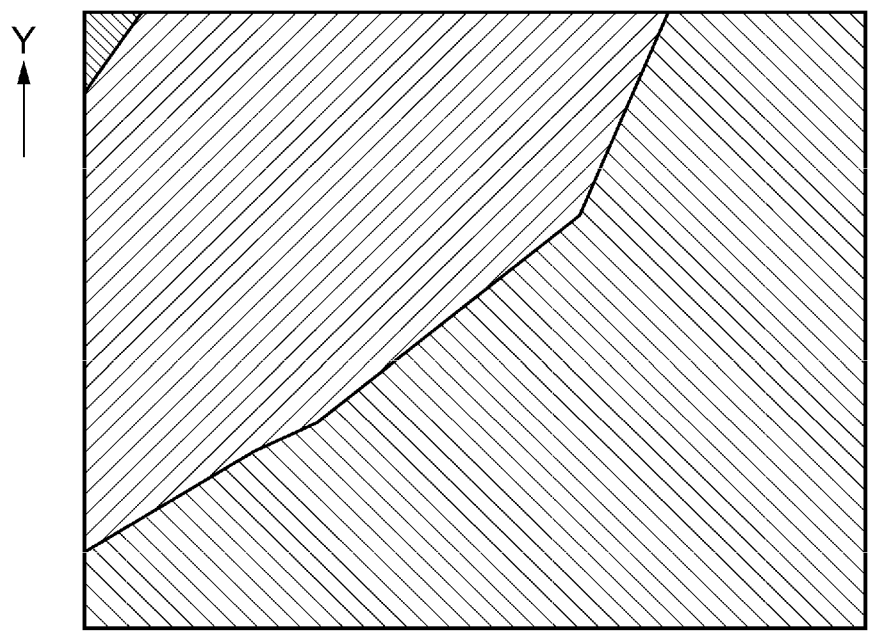
FIG. 4A is a distribution diagram showing polarization rotation efficiency of a half wave plate that rotates the polarization direction of first light outputted from a first light source.
Figure 4B:
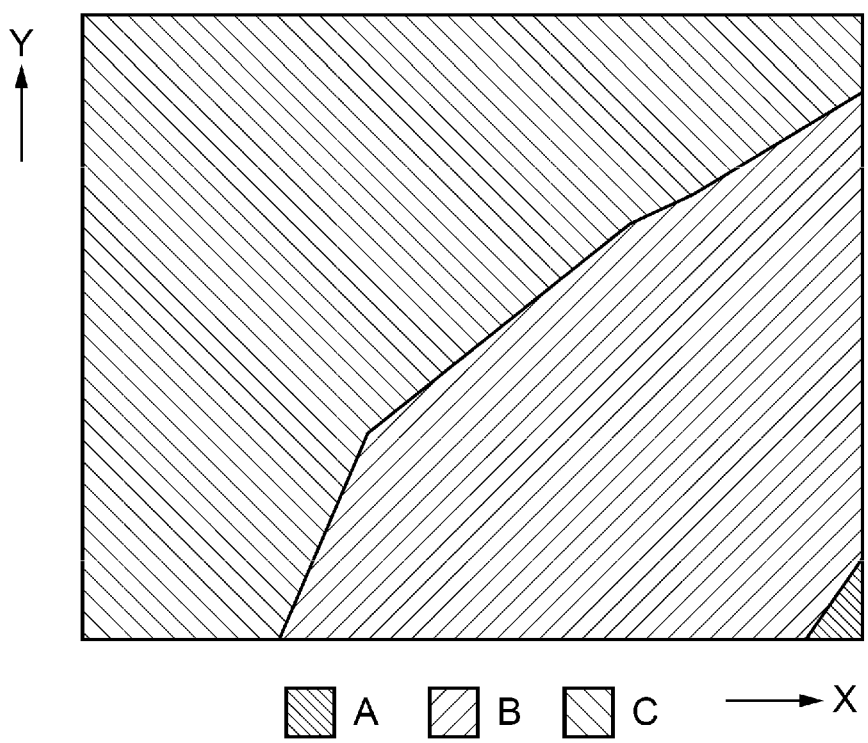
FIG. 4B is a distribution diagram showing the polarization rotation efficiency of the half wave plate that rotates the polarization direction of the first light outputted from a second light source.
Figure 5A:
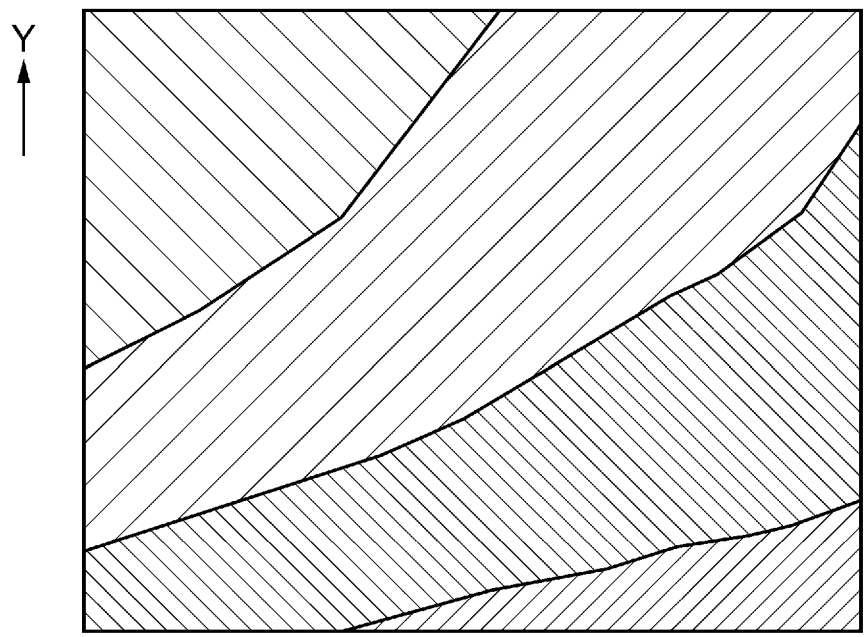
FIG. 5A is a distribution diagram showing the polarization rotation efficiency of a quarter wave plate that rotates the polarization direction of the first light outputted from the first light source.
Figure 5B:
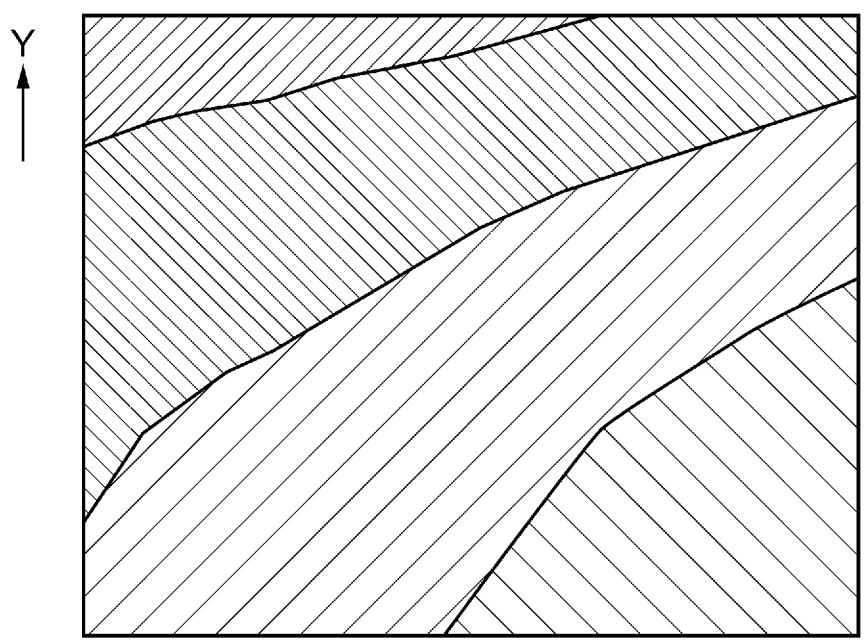
FIG. 5B is a distribution diagram showing the polarization rotation efficiency of the quarter wave plate that rotates the polarization direction of the first light outputted from the second light source.

The polarization rotation efficiency of the half wave plate 28a will be described in comparison with the polarization rotation efficiency of a quarter wave plate. FIG. 4A is a distribution diagram showing the polarization rotation efficiency of the half wave plate that rotates the polarization direction of the first light outputted from the first light source. FIG. 4B is a distribution diagram showing the polarization rotation efficiency of the half wave plate that rotates the polarization direction of the first light outputted from the second light source. FIG. 5A is a distribution diagram showing the polarization rotation efficiency of the quarter wave plate that rotates the polarization direction of the first light outputted from the first light source. FIG. 5B is a distribution diagram showing the polarization rotation efficiency of the quarter wave plate that rotates the polarization direction of the first light outputted from the second light source. FIGS. 4A and 4B show data on simulations performed on the half wave plate 28a in the present embodiment. FIGS. 5A and 5B show simulation data as Comparative Example when the half wave plate 28a is replaced with a quarter wave plate.

As described above, the afocal system 23 reduces the light flux diameter of the first light BL1 along the optical path from the first lens 23a toward the second lens 23b. The half wave plate 28a is disposed between the first lens 23a and the second lens 23b, in other words, in a halfway position in the optical path along which the light flux diameter described above is reduced. The angle of incidence of each of the light rays that form the first light BL1 therefore varies in accordance with the position where the light ray is incident on the light incident surface of the half wave plate 28a. FIGS. 4A and 4B each show in the form of a distribution diagram the variation in the polarization rotation efficiency resulting from the difference in the angle of incidence.

The polarization rotation efficiency in the present specification represents in the form of percentage the degree of possible rotation of the polarization plane of the incident light. In other words, the polarization rotation efficiency is conversion efficiency at which part of the s-polarized light component, which is the first polarized light component, is converted into the p-polarized light component, which is the second polarized light component, in the first light BL1. The greater the variation in the polarization rotation efficiency, the more noticeable the color unevenness of the illumination light WL. The simulation data shown in FIGS. 4A, 4B, 5A, and 5B by way of example correspond to the arrangement of the light source unit 25 described above under the condition that the reference polarization rotation efficiency is 22% and the incident angle described above ranges from 8° to 21°.

In the first light source 21a, the plurality of semiconductor lasers 211a are arranged in a matrix along the plane 21c. In the second light source 21b, the plurality of semiconductor lasers 211b are arranged in a matrix along the plane 21c. FIGS. 4A, 4B, 5A, and 5B do not show the polarization rotation efficiency of each of the light rays outputted from the plurality of semiconductor lasers 211a and 211b but diagrammatically show the distributions of the polarization rotation efficiency. The actual polarization rotation efficiency therefore corresponds to each of the light rays outputted from the semiconductor lasers 211a and 211b.

In FIGS. 4A, 4B, 5A, and 5B, the axis X corresponds to the direction in which the first light source 21a and the second light source 21b are adjacent to each other with the optical axis Ax1 sandwiched therebetween, and the axis Y corresponds to the direction present in the plane 21c and perpendicular to the axis X. The plurality of semiconductor lasers 211a and 211b are arranged in a matrix in the directions X and Y.

The hatching type legends in FIGS. 4A, 4B, 5A, and 5B show the ranges of the polarization rotation efficiency. Specifically, a hatching type A represents a range of the polarization rotation efficiency greater than or equal to 0% but smaller than 10%. A hatching type B represents a range of the polarization rotation efficiency greater than or equal to 10% but smaller than 20%. A hatching type C represents a range of the polarization rotation efficiency greater than or equal to 20% but smaller than 30%. A hatching type D represents a range of the polarization rotation efficiency greater than or equal to 30% but smaller than 40%. A hatching type E represents a range of the polarization rotation efficiency greater than or equal to 40% but smaller than 50%.

FIGS. 4A and 4B show that the half wave plate 28a provides polarization rotation efficiency smaller than 30%, indicating that variation in the polarization rotation efficiency is suppressed. In contrast, FIGS. 5A and 5B show that using a quarter wave plate increases the variation in the polarization rotation efficiency ranging from 10% to 50%. It is therefore demonstrated that using the half wave plate 28a can suppress the variation in the polarization rotation efficiency. In particular, using two light sources, the first light source 21a and the second light source 21b, as in the projector 1 according to the present embodiment, increases the degree of reduction of the light flux diameter along the optical path from the first lens 23a to the second lens 23b and results in an increase in the difference in the angle of incidence. In this case, the half wave plate allows reduction in the color unevenness of the illumination light WL.

1.4. Dependence of Polarization Rotation Efficiency on Angle of Incidence

Figure 6:
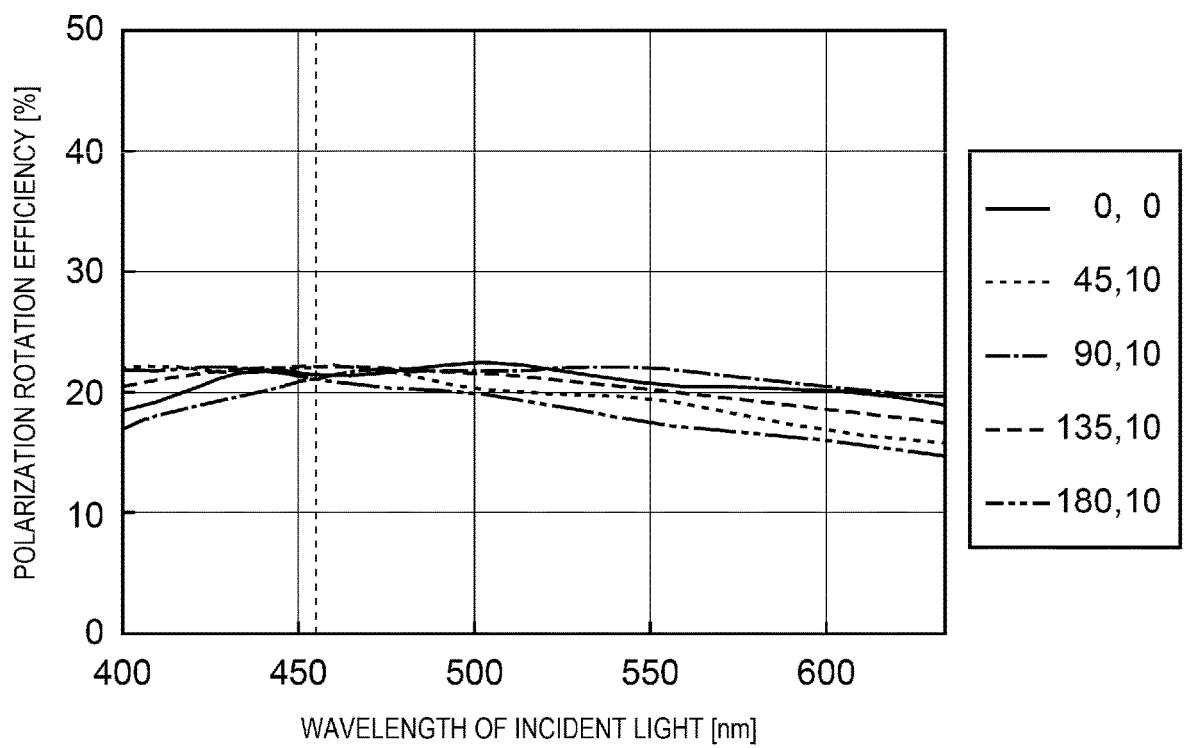
FIG. 6 shows graphs illustrating the dependence of the polarization rotation efficiency of a half wave plate on the angle of incidence.
Figure 7:
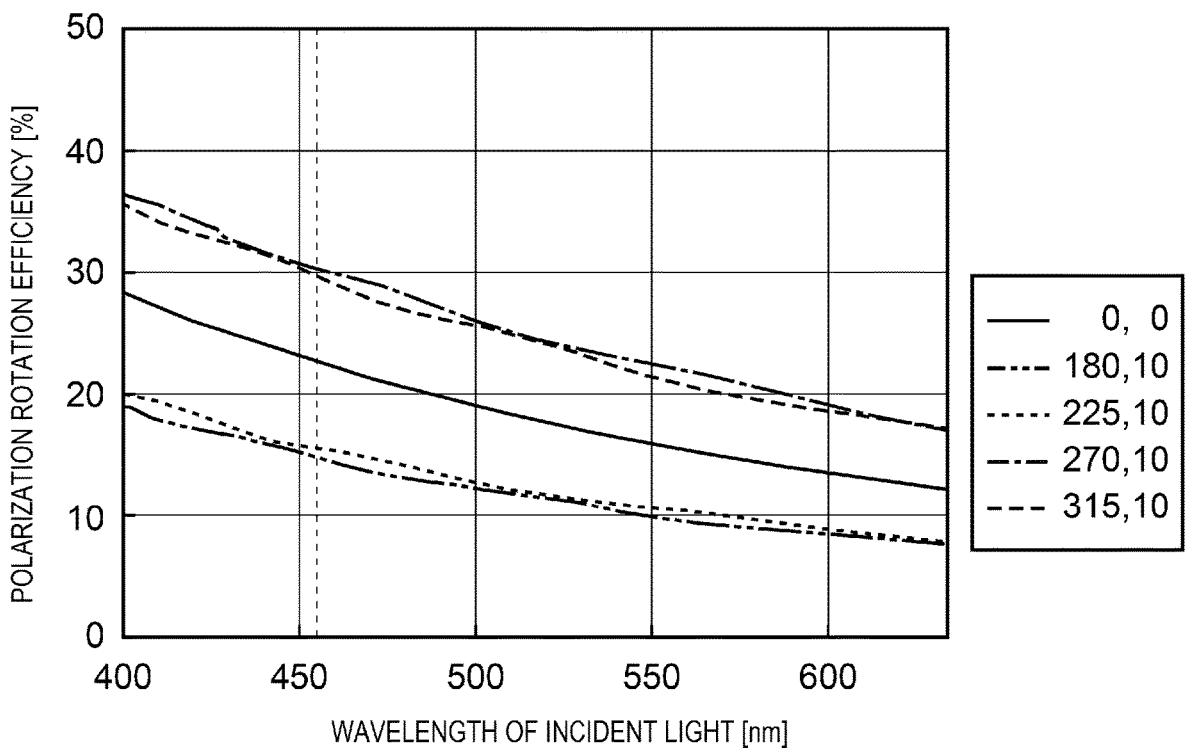
FIG. 7 shows graphs illustrating the dependence of the polarization rotation efficiency of a quarter wave plate on the angle of incidence.

The dependence of the polarization rotation efficiency of the half wave plate 28a on the angle of incidence will be described in comparison with the quarter wave plate. FIG. 6 shows graphs illustrating the dependence of the polarization rotation efficiency of the half wave plate on the angle of incidence. FIG. 7 shows graphs illustrating the dependence of the polarization rotation efficiency of the quarter wave plate on the angle of incidence.

FIG. 6 shows data on a simulation performed on the half wave plate 28a in the present embodiment. FIG. 7 shows data on a simulation performed on the quarter wave plate in Comparative Example. In FIGS. 6 and 7, the horizontal axis represents the wavelength of light incident on the wave plate and the vertical axis represents the polarization rotation efficiency. Each numeral string formed of two numerals shown in the line type legends are defined as follows: The first numeral represents the orientation angle; and the second numeral represents the angle of incidence of the light incident on the wave plate. The line types other than those representing the orientation angle of 0° and the angle of incidence of 0° represent data all obtained on the assumption that the light is obliquely incident on the wave plate at an angle of incidence of 10°. The simulation data shown in FIGS. 6 and 7 have been obtained on the assumption that the reference polarization rotation efficiency is 22%.

In FIG. 6, data obtained on the assumption that the orientation angle is 0° and the angle of incidence is 10° is omitted because the data coincides with data obtained on the assumption that the orientation angle is 180° and the angle of incidence is 10°. Similarly, in FIG. 7, data obtained on the assumption that the orientation angle is 0° and the angle of incidence is 10° coincides with data obtained on the assumption that the orientation angle is 180° and the angle of incidence is 10°. Data obtained on the assumption that the orientation angle is 45° and the angle of incidence is 10° coincides with data obtained on the assumption that the orientation angle is 225° and the angle of incidence is 10°. Data obtained on the assumption that the orientation angle is 90° and the angle of incidence is 10° coincides with data obtained on the assumption that the orientation angle is 270° and the angle of incidence is 10°. Data obtained on the assumption that the orientation angle is 135° and the angle of incidence is 10° coincides with data obtained on the assumption that the orientation angle is 315° and the angle of incidence is 10°. The data obtained on the assumption that the orientation angle is 0°, 45°, 90°, and 135° and the angle of incidence is 10° are omitted.

FIG. 6 shows that the half wave plate 28a suppresses the variation in the polarization rotation efficiency over the range of the orientation angle from 0° to 180°. FIG. 6 shows that the variation in the polarization rotation efficiency is smaller than or equal to about 10% over the range of the wavelength of the incident light from 400 nm to 640 nm, indicating small dependence of the polarization rotation efficiency on the angle of incidence. In particular, the dependence on the angle of incidence is further smaller for the incident light having the wavelength of 455 nm, which is the peak wavelength of the first light BL1 and used in the present embodiment. In contrast, FIG. 7 shows that the quarter wave plate increases the variation in the polarization rotation efficiency over the range of the orientation angle from 0° to 315°. In the range of the wavelength of the incident light from 400 nm to 640 nm, the variation in the polarization rotation efficiency ranges from about 10% to 15%, which is larger dependence on the angle of incidence of the incident light than in the case of the half wave plate 28a.

As described above, the illuminator 4 and the projector 1 according to the embodiment can provide the following effects.

The size of the illuminator 4 can be readily reduced. In detail, the half wave plate 28a is disposed between the first lens 23a and the second lens 23b of the afocal system 23. In addition to the above, the half wave plate 28a is so disposed as to be closer to the second lens 23b than to the first lens 23a. A light flux having a further reduced diameter therefore enters the half wave plate 28a as compared with a case where the half wave plate 28a is closer to the first lens 23a. The size of the half wave plate 28a can therefore be reduced, whereby the size of the illuminator 4 is readily further reduced.

Using the half wave plate 28a as the retardation film allows suppression of color unevenness of the illumination light. In detail, the half wave plate 28a has smaller dependence of the polarization rotation efficiency on the angle of incidence, for example, than the quarter wave plate. In other words, the half wave plate 28a allows smaller variation in the polarization rotation efficiency than the quarter wave plate even when the angle of incidence of the light flux incident on the wave plate increases. That is, the half wave plate 28a can reduce the variation in the polarization rotation efficiency and therefore suppress the color unevenness of the illumination light. An illuminator 4 that readily allows size reduction and suppresses the color unevenness of the illumination light can thus be provided.

Since the first light source 21a and the second light source 21b are each a solid-state light source, the illumination light can be readily high-luminous illumination light as compared with a case where a discharge-type light source is used.

Using the half wave plate 28a suppresses the variation in the polarization rotation efficiency due to the position where the light is incident on the wave plate and the angle of incidence of the incident light as compared with the case where using the quarter wave plate. Further, the ratio between the s-polarized light component and the p-polarized light component of the second light BL2 outputted from the light source unit 25 can be adjusted. The ratio between the seventh light BMsd7 and the fluorescence YL can thus be changed to adjust the white balance of the illumination light WL, which is white light.

Out of the second light BL2, the third light BMse3 can be used by causing it to be incident on the wavelength converter 27, and the fourth light BMp4 can be used by causing it to be incident on the diffuser 30. The fluorescence emitted from the wavelength converter 27 can further be caused to exit out of the polarization separator 50.

The quarter wave plate 28b, which is disposed in the optical path between the polarization separator 50 and the diffuser 30, can convert the p-polarized light component from the polarization separator 50 to be incident on the diffuser into a circularly polarized light and the circularly polarized light incident from the diffuser 30 into the s-polarized light component.

A projector 1 having further compactness and improved quality of a projected or otherwise provided image as compared with those in related art can be provided.

Contents derived from the embodiment will be described below.

An illuminator includes a light source unit, a polarization separator, a diffuser, and a wavelength converter. The light source unit includes a first light source, a second light source, an afocal system, and a half wave plate. The afocal system, the half wave plate, and the polarization separator are arranged along the first axis. The first light source and the second light source are arranged side by side along a plane perpendicular to the first axis. The afocal system includes a first lens and a second lens disposed in a position downstream of the first lens. The half wave plate is disposed in the first axis between the first lens and the second lens in a position close to the second lens.

According to the configuration described above, the size of the illuminator can be readily reduced. In detail, the half wave plate is disposed between the first lens and the second lens of the afocal system. In addition to the above, the half wave plate is so disposed as to be closer to the second lens than to the first lens. A light flux having a further reduced diameter therefore enters the half wave plate as compared with the case where the half wave plate is closer to the first lens. The size of the half wave plate can therefore be reduced, whereby the size of the illuminator is readily further reduced.

Using the half wave plate as the retardation film allows suppression of color unevenness of the illumination light. In detail, the half wave plate has smaller dependence of the polarization rotation efficiency on the angle of incidence, for example, than the quarter wave plate. In other words, the half wave plate allows smaller variation in the polarization rotation efficiency than the quarter wave plate even when the angle of incidence of the light flux incident on the wave plate increases. That is, the half wave plate can reduce the variation in the polarization rotation efficiency and therefore suppress the color unevenness of the illumination light. An illuminator that readily allows size reduction and suppresses the color unevenness of the illumination light can thus be provided.

In the illuminator described above, the first and second light sources are each preferably a solid-state light source that outputs the first light containing the first polarized light component.

According to the configuration described above, in which the first and second light sources are provided as the plurality of light sources in addition to the use of solid-state light sources, the illumination light can be readily high-luminous illumination light.

In the illuminator described above, the half wave plate may transmit the first light and convert the first light into second light containing the first polarized light component and the second polarized light component having a polarization direction perpendicular to that of the first polarized light component, and the half wave plate may include a polarization adjustment mechanism that rotates the half wave plate in a plane intersecting the center axis of the first light.

According to the configuration described above, the variation in the polarization rotation efficiency due to the position where the light is incident on the wave plate and the angle of incidence of the incident light can be suppressed as compared with the case using the quarter wave plate. Further, the ratio between the first polarized light component and the second polarized light component of the second light outputted from the light source unit can be adjusted.

In the illuminator described above, the light source unit may output the second light toward the polarization separator. The polarization separator may separate the second light into the third light, which is formed of the first polarized light component, and the fourth light, which is formed of the second polarized light component. The fourth light may exit out of the polarization separator toward the diffuser. The third light separated by the polarization separator may be incident on the wavelength converter.

According to the configuration described above, out of the second light, the third light can be used by causing it to be incident on the wavelength converter, and the fourth light can be used by causing it to be incident on the diffuser.

In the illuminator described above, the wavelength converter may be excited by the third light and emit fluorescence toward the polarization separator, and the polarization separator may transmit the fluorescence.

According to the configuration described above, the fluorescence emitted from the wavelength converter may exit out of the polarization separator.

In the illuminator described above, a quarter wave plate may be disposed in the optical path between the polarization separator and the diffuser.

According to the configuration described above, the second polarized light component from the polarization separator to be incident onto the diffuser can be converted into circularly polarized light, and the circularly polarized light incident from the diffuser can be converted into the first polarized light component.

A projection-type display apparatus includes the illuminator described above, a light modulator that modulates light outputted from the illuminator, and a projection optical apparatus that projects the light modulated by the light modulator.

According to the configuration described above, a projection-type display apparatus having further compactness and improved quality of a projected or otherwise provided image as compared with those in related art can be provided.

What is claimed is:

1. An illuminator comprising:
   a first light source;
   a second light source;
   a first lens on which light emitted from the first and second light sources is incident, the first lens being a convex lens;
   a second lens disposed in a downstream of the first lens, the second lens being a concave lens;
   a half wave plate disposed between the first lens and the second lens; and
   a homogenizer system on which light emitted from the second lens is incident, wherein:
   the homogenizer system includes a first multi-lens array,
   the first lens, the second lens and the half wave plate are arranged along a first axis,
   the first light source and the second light source are arranged along a plane perpendicular to the first axis, and
   the half wave plate is located along the first axis in a position shifted from a middle point between the first lens and the second lens toward the second lens.

2. The illuminator according to claim 1, wherein the first and second light sources are each a solid-state light source emitting a first light containing a first polarized light component.

3. The illuminator according to claim 2, further comprising:
   a polarization adjustment mechanism,
   wherein the half wave plate transmits the first light and converts the first light into a second light containing both the first polarized light component and a second polarized light component having a polarization direction perpendicular to a polarization direction of the first polarized light component, and
   the polarization adjustment mechanism rotates the half wave plate in a plane intersecting a center axis of the first light.

4. The illuminator according to claim 3, further comprising:
   a polarization separator arranged along the first axis and disposed in a downstream of the second lens;
   a diffuser; and
   a wavelength converter,
   wherein the second light outputted from the second lens is incident on the polarization separator,
   the polarization separator separates the second light into a third light composed of the first polarized light component and a fourth light composed of the second polarized light component,
   the fourth light outputted from the polarization separator is incident on the diffuser, and
   the third light outputted from the polarization separator is incident on the wavelength converter.

5. The illuminator according to claim 4,
   wherein the wavelength converter is excited by the third light and emits fluorescence toward the polarization separator, and
   the polarization separator transmits the fluorescence.

6. The illuminator according to claim 5, further comprising:
   a quarter wave plate disposed in an optical path between the polarization separator and the diffuser.

7. A projection-type display apparatus comprising:
   the illuminator according to claim 1;
   a light modulator modulating light outputted from the illuminator; and
   a projection optical apparatus projecting the light modulated by the light modulator.

8. The illuminator according to claim 1, wherein the first light source and the second light source are arranged along the plane perpendicular to the first axis such that light emitted from the first light source and the second light source are initially emitted in a direction parallel to the first axis.

9. An illuminator comprising:
   a first light source;
   a first lens on which light emitted from the first light source is incident, the first lens being a convex lens;
   a second lens disposed in a downstream of the first lens, the second lens being a concave lens;

a half wave plate disposed between the first lens and the second lens; and a homogenizer system on which light emitted from the second lens is incident, wherein:

the first lens, the second lens and the half wave plate are arranged along a first axis, the first light source is arranged along a plane perpendicular to the first axis, and the half wave plate is located along the first axis in a position shifted from a middle point between the first lens and the second lens toward the second lens.

* * * * *